Patented June 12, 1951

2,556,971

UNITED STATES PATENT OFFICE 2,556,971

PROCESS FOR THE MANUFACTURE OF MONOAROYLATED 1:4 - DIAMINO-AN-THRAQUINONES

Eduard Moergeli, Neuewelt, near Basel, Switzerland, assignor to Ciba Limited, Basel, Switzerland, a Swiss firm No Drawing. Application February 17, 1949, Serial No. 77,066. In Switzerland February 27, 1948

7 Claims. (Cl. 260—377)

It is known that monobenzoyl-diaminoanthraquinones, among which 1-amino - 4 - benzoyl-aminoanthraquinone is a valuable intermediate product, can be made by mono-benzoylating diaminoanthraquinones under suitable conditions. While processes in which benzoic anhydride is used for this purpose are much less favorable from the point of view of economy than processes in which benzoyl chloride can be used as the benzoylating agent, the impression to be gathered from the literature is that monobenzoylated compounds can at best be obtained with difficulty in a sufficiently pure state by using benzoyl chloride as benzoylating agent.

Recently, processes have become known in which the anthraquinone components for the production of monobenzoylated 1:4-diamino-anthraquinones are used in the leuco-form (as stable dihydro-compounds), compare U. S. Patent No. 2,378,812. These processes are of interest because the 1:4-diaminoanthraquinone necessary as starting material is obtained in large scale commercial manufacture in the form of the leuco-compound and the latter compound must in any case be oxidized to the corresponding anthraquinone derivative at some stage. However, these processes have the disadvantage that, according to statments in the patent specification in question, premature oxidation of the leuco-compound to the diaminoanthraquinone must be avoided if the process is to be successful.

Furthermore it is necessary according to this old process to remove an excess of benzoyl chloride from the reaction mixture in a separate step, for example by filtering and washing the crude product or by steam distillation or by combining both methods, before the leuco-monobenzoyldi-amino-compound can be oxidized since otherwise an excess of benzoyl-chloride would react at the high temperature necessary for oxidation and undesired dibenzoylated products would be obtained. The said specification, however, states that amongst the different methods involving monobenzoylating reactions only the claimed process leads to really pure monoaroyl-1:4-di-aminoanthraquinones.

According to the present invention monoaroylated 1:4-diaminoanthraquinones are made in an advantageous manner and in an uninterrupted sequence of steps by first oxidizing a leuco-1:4-diamino-anthraquinone by means of a nitrated aromatic hydrocarbon in the presence of a tertiary aromatic base as catalyst to form the 1:4-diaminoanthraquinone, and then reacting the latter without separating an intermediate product with a benzoyl chloride in such proportion and under such conditions that practically no dibenzoyl-compound is formed.

The leuco 1:4-diaminoanthraquinones used as starting materials may be used in the so-called stable leuco-form such as is obtained, for example, by reacting leuco-1:4-dihydroxyanthra-quinone with ammonia. The leuco-1:4-diamino-anthraquinones may be free from further substituents or may contain substituents which do not adversely affect the reaction, advantageously in the benzene nucleus other than that in which the amino groups are present, for example, in 5-, 6- or 7-, or in 6- and 7-position. The oxidation to the corresponding diaminoanthraquinones may be carried out, for example, in nitrobenzene which serves both as a solvent and as an oxidizing agent. As oxidation catalysts there may be used tertiary amines and with advantage dialkyl-anilines containing alkyl radicals with less than 5 carbon atoms, especially diethyl-aniline. The oxidation may be brought about by heating for a few hours at 140–200° C., especially at 160° C. Under the conditions described the oxidation is in some cases complete in two hours.

For reaction with the resulting 1:4-diamino-anthraquinone in the reaction mixture there may be used benzoyl chloride itself or a substitution product thereof such as a halogen-, alkoxy- or cyano-benzoyl chloride, or a benzoyl chloride which contains as a nuclear substituent a sulfone or sulfon-amide group, for example, a methyl-sulfone, phenyl-sulfone, benzyl-sulfone, sulfon-dimethylamide, sulfon-diethylamide, sulfon-pi-peridide, sulfon-morpholide or like group.

In carrying out the reaction there are advantageously used approximately equimolecular proportions of the diaminoanthraquinone and the benzoyl chloride or a small excess of the latter. In many cases, especially when benzoyl chloride itself is used, it is of advantage to keep this excess relatively small, for example, at about 10 to at most 20 per cent. The reaction is carried out, without separating an intermediate product, in the reaction medium in which the oxidation was conducted, and then no addition of an acid-binding agent, the presence of which is desirable for the reaction, is necessary when an agent such as a dialkyl-aniline, especially diethyl-aniline, remains in the reaction mixture from the first reaction stage. The acylation is advantageously carried out at a moderately raised temperature, for example from about 50° C. up to about 70° C. and advantageously from 60° C. to 65° C.

The process of the invention, therefore, enables valuable monoaroylated 1:4-diaminoan-thraquinones to be made in a single, uninterrupted operation while starting from leuco-1:4-diaminoanthraquinones which are readily available technically.

The monobenzoyl-1:4-diaminoanthraquinones so obtained are in part known and are valuable intermediates for the manufacture of dyestuffs.

The following examples illustrate the invention, the parts and percentages being by weight unless otherwise stated and the relationship of parts by weight to parts by volume being the same as that of the kilogram to the liter:

Example 1

10 parts of leuco-1:4-diaminoanthraquinone are heated with 10 parts of diethylaniline and 35 parts of nitrobenzene for 2 hours at 160° C. The reaction mixture is then cooled to about 60° C., a mixture of 6.5 parts of benzoyl chloride and 20 parts of nitrobenzene is added, and the reaction is allowed to proceed, while stirring, for 4 hours at 60–65° C. The whole is then allowed to cool, and the resulting 1-amino-4-benzoylaminoanthraquinone is separated by filtration. If desired, it may be washed or recrystallized. Even without recrystallization there is obtained a practically pure product in a yield of about 85 per cent.

The process can be conducted in a similar manner with the use of a benzoyl chloride substituted in the benzene nucleus.

Example 2

30 parts of leuco-1:4-diaminoanthraquinone are heated while stirring well with 20 parts by volume of diethylaniline and 100 parts by volume of nitrobenzene for 2 hours at 160° C. The reaction mixture is then cooled to 60° C., a solution of 21 parts of benzoyl chloride, 10 parts by volume of diethylaniline and 50 parts by volume of nitrobenzene is run in the course of 4 hours at 60–65° C., and then the whole is stirred for a further hour at the same temperature. The whole is allowed to cool, and the resulting 1-amino-4-benzoylaminoanthraquinone is separated by filtration and washed with a solution of nitrobenzene and diethylaniline. The solvent still adhering to the reaction product is removed by distillation with steam, after the addition of sodium carbonate. In this manner a practically pure product is obtained in a yield of about 85–90 per cent.

By using, instead of 21 parts of benzoyl chloride, 26.3 parts of para-chlorobenzoyl chloride and advantageously a rather large quantity of nitrobenzene to facilitate stirring, 1-amino-4-(para-chloro-benzoyl)-amino-anthraquinone is obtained in an analogous manner in the form of a more or less amorphous substance. Benzoyl chlorides containing further substituents, as indicated above, may be used in an analogous way. If the reaction mixture becomes too thick more nitrobenzene may be added.

What I claim is:

1. In a process for the manufacture of monobenzoyl derivatives of 1:4-diamino-anthraquinone, wherein leuco-1:4-diamino-anthraquinone is used as a starting product, the improvement which comprises first oxidizing leuco-1:4-diaminoanthraquinone by means of nitrobenzene in the presence of a tertiary base as catalyst to form 1:4-diamino-anthraquinone and then, without separating an intermediate product, reacting the latter with at most 20 per cent. excess of a benzoyl chloride at a temperature between about 50° C. and 70° C.

2. In a process for the manufacture of monobenzoyl derivatives of 1:4-diamino-anthraquinone, wherein leuco-1:4-diamino-anthraquinone is used as a starting product, the improvement which comprises first oxidizing leuco-1:4-diaminoanthraquinone by means of nitrobenzene in the presence of a dialkylaniline as catalyst to form 1:4-diamino-anthraquinone and then, without separating an intermediate product, reacting the latter with at most 20 per cent. excess of a benzoyl chloride at a temperature between about 50° C. and 70° C.

3. In a process for the manufacture of monobenzoyl - 1:4 - diamino-anthraquinone, wherein leuco-1:4-diaminoanthraquinone is used as a starting product, the improvement which comprises first oxidizing leuco 1:4-diamino-anthraquinone by means of nitrobenzene in the presence of diethyl-aniline as catalyst to form 1:4-diaminoanthraquinone, and then, without separating an intermediate product, reacting the latter with at most 20 per cent. excess of benzoyl chloride at a temperature between about 50° C. and 70° C.

4. In a process for the manufacture of a monobenzoyl - 1:4 - diamino-anthraquinone, wherein leuco-1:4-diamino-anthraquinone is used as a starting product, the improvement which comprises first oxidizing leuco 1:4-diamino-anthraquinone by means of nitrobenzene in the presence of diethyl-aniline as catalyst to form 1:4-diamino-anthraquinone, and then, without separating an intermediate product, reacting the latter with at most 20 per cent. excess of para-chlorobenzoyl chloride at a temperature between about 50° C. and 70° C.

5. A process for the manufacture of a monobenzoyl derivative of 1:4-diamino-anthraquinone, which comprises directly subjecting the mixture resulting from the oxidation of leuco-1:4-diamino-anthraquinone by means of nitrobenzene in the presence of a tertiary base as catalyst, to the action of at most 20 per cent. excess of a benzoyl chloride at a temperature between about 50° C. and 70° C.

6. A process for the manufacture of monobenzoyl-1:4-diamino-anthraquinone, which comprises directly subjecting the mixture resulting from the oxidation of leuco-1:4-diamino-anthraquinone by means of nitrobenzene in the presence of diethyl-aniline, to the action of at most 20 per cent. excess of benzoyl chloride at a temperature between about 50° C. and 70° C.

7. A process for the manufacture of monobenzoyl-1:4-diamino-anthraquinone, which comprises directly subjecting the mixture resulting from the oxidation of leuco-1:4-diamino-anthraquinone by means of nitrobenzene in the presence of diethyl-aniline, to the action of at most 20 per cent. excess of para-chlorobenzoyl chloride at a temperature between about 50° C. and 70° C.

EDUARD MOERGELI.

REFERENCES CITED

The following references are of record in the file of this patent:

UNITED STATES PATENTS

| Number | Name | Date |
| --- | --- | --- |
| 957,042 | Deinet | May 3, 1910 |
| 1,856,212 | Gassner et al. | May 3, 1932 |
| 2,207,045 | Wilder | July 9, 1940 |
| 2,378,812 | Waldron et al. | June 19, 1945 |

FOREIGN PATENTS

| Number | Country | Date |
| --- | --- | --- |
| 482,582 | Great Britain | Mar. 28, 1938 |